N. B. ACHESON.
Nut-Lock.

No. 201,144.  Patented March 12, 1878.

Attest:
Geo. T. Rudge
Geo. Rudge Jr.

Inventor:
Nathan B. Acheson.

UNITED STATES PATENT OFFICE.

NATHAN B. ACHESON, OF YOUNGSTOWN, OHIO.

IMPROVEMENT IN NUT-LOCKS.

Specification forming part of Letters Patent No. 201,144, dated March 12, 1878; application filed September 19, 1877.

*To all whom it may concern:*

Figure 1:
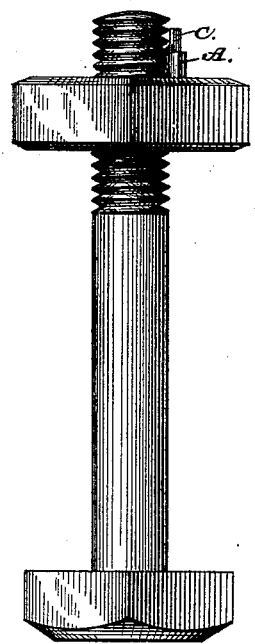
Figure 2:
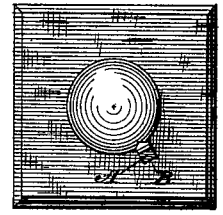

Be it known that I, NATHAN B. ACHESON, of the city of Youngstown, county of Mahoning, and State of Ohio, have invented an Improved Nut-Lock, of which the following is a specification:

Figure 1 represents a view of the nut bolt and lock combined. Fig. 2 is an end view of the nut with the slot or groove in it, into which the key or lock is driven. C A, in Fig. 1, represents the key or lock in its position when the nut is locked.

This invention relates to a new and effective nut-lock, to be applied to a nut in almost any use where it is desired to lock the nut; and consists in the use of a locking pin or key, which is driven in the slot or groove in the nut, as shown in both figures. The key or pin fits into the slot or groove in the nut closely on its sides and top, except on the under side next to the threads of the bolt. The key is bevel or wedge shaped on that side, and the groove in the nut may or may not be slightly wedge-shaped, so as to drive the bevel or wedge edge of the key or pin into the threads of the bolt when the pin is driven into the slot or groove in the nut. Thus the edge of the key or pin cuts into the threads of the bolt, and firmly prevents the nut from turning in its position. After the key or pin is driven into the nut until it has locked the nut, as just described, the projecting end of the key C, Fig. 1, is driven into the threads of the bolt, as shown in Fig. 1, and this completely keeps the pin from coming out. This end can be bent back when it is desired to remove the nut, and the pin drawn by tongs and the nut removed. The pin is thus small, and is made of steel or other hard metal.

I am aware that it is not new to prevent a nut from turning upon its bolt by driving a key into corresponding grooves cut into the bolt and nut, and I therefore do not claim such invention.

I am aware that other inventors lock the nut by pin; but in that of Edwin H. Dooley, dated January 10, 1872, the pin is in the bolt instead of in the nut, as in my invention; and in said Dooley's the pin runs the entire length of the bolt, thus weakening the bolt and requiring more metal, which is then useless and wasted, and which, if the pin is of steel or other hard metal, is expensive. Said Dooley's invention is more expensive, and is more cumbersome and clumsy, and harder to apply, than mine. In said Dooley's patent, also, the pin is fastened over the end of the bolt, while in mine the pin is fastened by driving the end of the pin into the threads of the bolt.

I am also aware that a patent on a nut-lock with pin has been granted to William Hamilton, dated December 29, 1868; but in his invention the groove is in the bolt also, while in mine it is in the nut; and his has no means for fastening the pin in place, as mine has.

Having thus described my invention, I claim as new and desire to secure by Letters Patent—

The improved nut-lock herein described, consisting of the grooved nut and tapered locking-pin, the latter adapted to be driven into the groove in the nut, and to cut into the threads of the bolt, and provided with a head, C, for driving between the threads of the bolt, to prevent the withdrawal of the pin, as and for the purpose set forth.

NATHAN B. ACHESON.

Witnesses:
A. E. KNIGHT,
ED. RUSH.